P. C. BAIRD.
BED SUPPORTING MEANS FOR VEHICLES.
APPLICATION FILED MAY 1, 1917.
1,340,204.
Patented May 18, 1920.
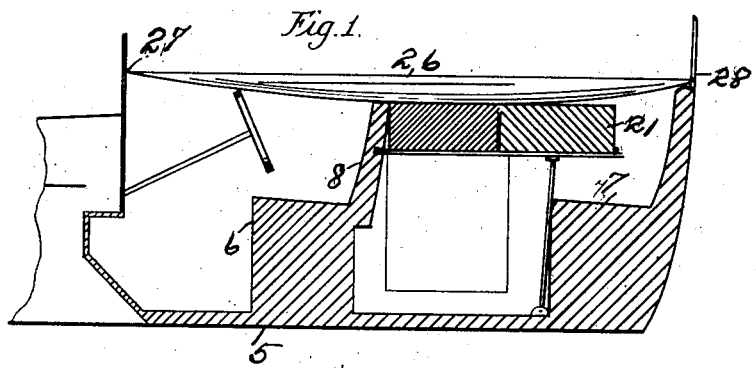
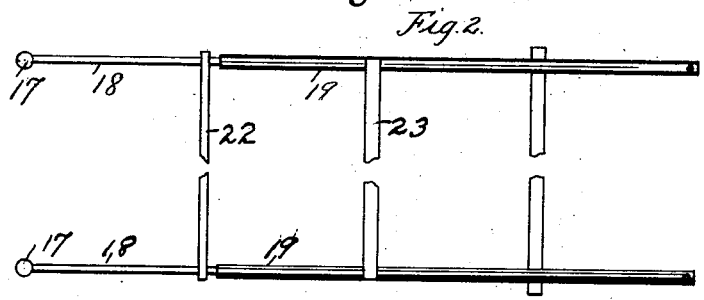
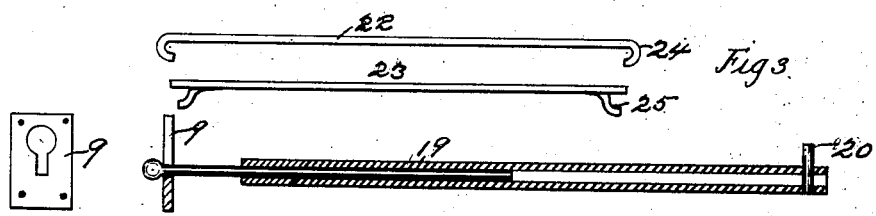
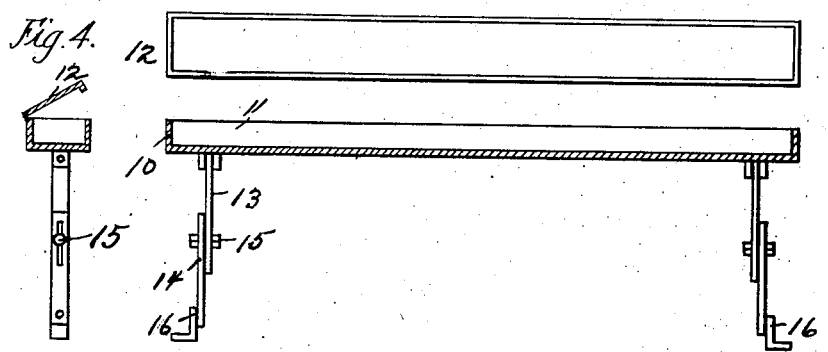
INVENTOR
Phil C. Baird

UNITED STATES PATENT OFFICE.

PHILANDER C. BAIRD, OF OKLAHOMA, OKLAHOMA.

BED-SUPPORTING MEANS FOR VEHICLES.

1,340,204.   Specification of Letters Patent.   Patented May 18, 1920.

Application filed May 1, 1917. Serial No. 165,762.

*To all whom it may concern:*

Be it known that I, PHILANDER C. BAIRD, a citizen of the United States, and a resident of the city, county, and State of Oklahoma, have invented new and useful Bed-Supporting Means for Vehicles, of which the following is a specification.

This invention relates to an accessory for vehicles, boats and like instrumentalities, providing convenient means for storing and carrying a collapsing structure for supporting a bed.

It is an object of the invention, in the main, to provide a structure of the type specified that can be stored away in a cavity to be formed in the foot rest of such vehicles or boats.

Other objects of the invention, of course, will appear, as the reading of the following specification proceeds.

The drawing, accompanying and forming a part of the specification, illustrates, what may be considered a convenient form of the invention, but such other forms as may be wise, in view of cost of manufacture, and so forth, will be comprehended within the purview of the invention.

On the drawing, Figure 1 illustrates the embodiment in place in a vehicle, partly sectionally illustrated.

Fig. 2 is a plan view of portions of the device.

Fig. 3 includes details of elements.

Fig. 4 illustrates the foot rest in various positions, and partly in section.

In these views, similar characters of reference, will indicate similar parts.

The vehicle 5, of the two seat type is provided with seats 6 and 7, the front one having in its back 8 escutcheons 9.

A foot rest 10 is provided with a cavity, and lid 12, and is supported on sliding links 13 and 14, to be relatively positioned and thus held by bolts 15, and these links 14 are pivotedly supported in ears 16, secured to the floor of the vehicle.

Provided with heads 17 rods 18 are telescoped in rods 19, which, when the links 13 and 14 are extended and thus held by the bolts 15, as in the position shown in Fig. 1, are supported on the foot rest 10, while the heads 17 take into the escutcheons 9, all of which can be seen by reference to Fig. 1.

The rods 19 are each provided with stops 20 to retain from shifting the cushions of the vehicles, numbered 21 which are placed on the rods 18 and 19, when the apparatus is in position to use the bed.

These rods 19 and 18 bear cross-bars 22 and 23, one hooking by hooks 24 about the rods 18 while the other provided with cleats 25, serves to separate the bars to the proper position.

When the parts are in the position, shown in Fig. 1, then a hammock 26 may be swung from points 27 and 28, and bedding placed for service.

When the device is not in use, it may be knocked down, packed in the cavity of the foot rest, the links 13 and 14 telescoped and the rest lowered to position for use.

Thus it will be seen that there is provided a useful accessory for vehicles, which is compact and may become a part of the vehicle already in use.

Having thus described this invention, I claim:

In combination with a vehicle body having front and rear seats, escutcheons in the back of the front seat, extensible members pivotally connected to said body adjacent to the rear seat and movable from a horizontal to an upright position, a foot rest including a receptacle connected to the free ends of said members, telescopic rods having means on their forward ends engaging said escutcheons and supported at their rear ends by said foot rest when in elevated position and cross members supported by said rods, said rods and cross members being adapted to be housed in said receptacle when not in use.

Signed at Oklahoma, in the county and State of Oklahoma, this 26th day of April, in the year of our Lord, nineteen hundred and seventeen.

PHIL. C. BAIRD.